United States Patent [19]
Machek

[11] 3,854,501
[45] Dec. 17, 1974

[54] ANTILOCK BRAKE SYSTEM AND CONTROL VALVE THEREFOR

[75] Inventor: John A. Machek, Creve Coeur, Mo.

[73] Assignee: Wagner Electric Corporation, Newark, N.J.

[22] Filed: June 14, 1973

[21] Appl. No.: 369,966

[52] U.S. Cl.............. 137/627.5, 91/410, 91/443, 303/21 AF, 137/513.5
[51] Int. Cl............................................ B60t 8/12
[58] Field of Search ............ 188/181 A; 303/21 AF; 137/627.5, 513.5; 91/410, 443

[56] References Cited
UNITED STATES PATENTS

| | | | |
|---|---|---|---|
| 2,742,057 | 4/1956 | Krieck | 137/513.5 X |
| 3,113,432 | 12/1963 | Watson | 91/443 UX |
| 3,164,141 | 1/1965 | Jones | 137/513.5 X |
| 3,459,403 | 8/1969 | Royer | 137/513.5 X |
| 3,758,167 | 9/1973 | Machek | 303/21 AF |
| 3,773,366 | 11/1973 | Reinecke | 303/21 AF |

FOREIGN PATENTS OR APPLICATIONS

| | | | |
|---|---|---|---|
| 980,652 | 1/1965 | Great Britain | 137/627.5 |

*Primary Examiner*—Robert G. Nilson

[57] ABSTRACT

A control valve for an antilock brake system is provided with a housing, and means movable in the housing in response to control fluid pressure applied thereto between an inoperative position and an operative position effecting the application through the housing of fluid pressure supplied thereto. Other means are also movable in the housing to a position predeterminately restricting the applied flow of control fluid pressure to the first-named movable means upon the movement thereof to its operative position. Also disclosed is a control valve for an antilock brake system having a housing with a chamber therein for control fluid pressure in which relay means is movable in response to the control fluid pressure to effect the application through the housing of fluid pressure supplied thereto. A pair of flow passages is provided in the housing through which the control fluid pressure is applied to the chamber and a pair of solenoid means controls the flow of the control fluid pressure through the flow passages, at least one of the solenoid means also being operable for venting the control fluid pressure from the chamber. An antilock brake system is also disclosed along with a method of cyclically applying and exhausting fluid pressure to and from a brake.

46 Claims, 8 Drawing Figures

PATENTED DEC 17 1974 3,854,501

ANTILOCK BRAKE SYSTEM AND CONTROL VALVE THEREFOR

BACKGROUND OF THE INVENTION

This invention relates generally to brake systems and in particular to antilock brake systems and control valves therefor.

As is well known in the art, brake antilock systems are divided into three fundamental operating components: the fluid pressure control valve for applying and exhausting fluid pressure to and from the vehicle brakes for decelerating the vehicle; the sensor component which "reads" vehicle wheel speed and signals the instantaneous speed condition thereof; and the logic component which analyzes the sensor wheel speed signal and "tells" the control valve component whether it is applying too much actuating fluid pressure to the brakes thereby to effect fluid pressure exhaustion or not applying enough actuating fluid pressure to the brakes thereby to increase the actuating fluid pressure magnitude. This explanation of the brake antilock system operation is somewhat over-simplified for the sake of brevity since the fundamental components thereof are highly sophisticated. It follows from the above simplified explanation of the antilock brake system operation that it is more effective and will provide a more accurate brake antilock or antiskid vehicle deceleration when such system cycles and recycles a great number of times each second that the brakes are applied during vehicle deceleration. But, paradoxically, the necessary successive cyclical operations of the antilock brake system engenders several disadvantageous and undesirable features which are directly correlative to such successive recycling of the system. For instance, an undesirable feature of the past antilock brake systems was their tendency to overshoot the reapplication pressure necessary to effect reenergization of the brakes each time the system cycled. Such overshoot produced rather violent wheel decelerations, particularly when the vehicle was being operated on a slippery roadbed, resulting in a series of brake lock-ups which produced intermittent jerking of the vehicle during a skid control stop. The overshooting of reapplication pressure during a vehicle skid control stop is primarily the result of system loop lag times prevalent in the past antilock brake systems. Another disadvantageous feature of the past antilock brake systems was that the reapplication rate of fliud pressure applied to effect reenergization of the vehicle brakes each time the system cycled was, for the most part, uniform thereby to produce the above-discussed problem of overshooting the magnitude of the reapplication pressure necessary to effect a smooth skid control deceleration instead of the above-mentioned intermittent jerking of the vehicle during a skid control stop. Of course, some of the past antilock brake systems attempted to overcome the problem of overshooting the optimum magnitude of the reapplication pressure for effecting a smooth vehicle skid control stop by attempting to regulate their uniform reapplication pressure rate at the upper range of the reapplication pressure near the optimum point or magnitude of the reapplication pressure necessary to effect a smooth vehicle skid control stop; however, such regulation met with only varied success and involved added and costly electronic apparatus and circuits. Furthermore, each time the antilock brake system cycles between its fluid pressure applying and exhausting modes of operation, fluid pressure is exhausted to atmosphere, and it is quite apparent that a large number of such exhaustions during each second of a braking application places a fluid pressure "make-up" burden on the components or portion of the system which supplies fluid pressure to it for actuating the brakes. To fully understand the undesirable feature of overexhausting fluid pressure from the brake antilock system, the cycles of such system may be viewed, with respect to the cyclical application and exhausting of brake actuating fluid pressure, as a series of pressure peaks and valleys. In other words, when the logic portion analyzes the sensor component wheel speed signal of an incipient brake-locking or skidding condition, the logic component causes the control valve component to exhaust fluid pressure thereby to relieve the incipient brake-locking condition and cause a valley in the brake antilock system cycle. But, when brake actuating fluid pressure is so exhausted, the brakes are deactuated thereby to permit free, or substantially free, rolling condition of the vehicle wheels. However, this free rolling condition of the vehicle wheels is again ascertained by the sensor component and signaled to the logic component which again causes the control valve component to again reapply fluid pressure to effect re-energization of the vehicle brakes causing a pressure riser or a peak after the valley. The brake antilock system recycles time and time again each second throughout the duration of the vehicle deceleration thereby effecting a series of successive pressure peaks and valleys. Quite obviously, in view of the large number of application and exhaustion cycles, the above-mentioned fluid pressure make-up burden placed on the fluid pressure supplying portion of the antilock brake system can be an undesirable feature and an important consideration in the design of such systems if the system is completely exhausted during each cycle thereof.

In addition to the above discussed undesirable feature, the time delay or the period of time between successive peaks and valleys of the cycling application and exhaustion of fluid pressure produces substantially free vehicle wheel roll, i.e., without the retarding effect of the brakes, which increases the overall time and distance of the vehicle deceleration or stop. In the past antilock brake systems, attempts have been made to overcome the time period of free wheel roll thereby to shorten the vehicle stopping distance under the influence of the antilock brake system by providing complicated, sophisticated and costly electronic schemes in the logic component with only marginal success. The free wheel roll condition causing increased stopping distances remains, along with the above-mentioned over-exhaustion or make-up burden, an undesirable feature of the past antilock brake systems.

It is also apparent that the continual successive cycling and recycling of the antilock brake system thereby to continually apply and exhaust fluid pressure effecting actuation and deactuation of the vehicle brake also places a burden, structurally, on the vehicle brakes when the above-discussed problem of overshooting the optimum magnitude of the reapplication fluid pressure necessary to effect a smooth skid control stop is encountered thereby to effect an intense, harsh and intermittent jerking of the vehicle. This structural burden is also an undesirable feature correlative with repetitive cyclical operations of the past antilock brake systems. In other words, the aforementioned successive peaks and valleys illustrative of antilock brake system operation represent the successive actuations and deactuations of the vehicle brakes with each successive recycling of the antilock brake system which, as previously mentioned, occurs a great number of times during each second of the vehicle braking application. Such repetitive energization and deenergization of the vehicle brakes quite obviously places them under rather severe structural stresses in systems which completely exhaust brake actuating fluid pressure each system cycle thereby necessitating reapplication of brake actuating fluid pressure across the entire pressure or force range or gradient effective during a particular braking application. In order to slow down or control the rise rate of the reapplication fluid pressure during each cycle of the past antilock brake systems, static orifices have been used, but it was found that elaborate and costly filters and filter systems were then mandatory in order to prevent water, which results primarily from the condensation of moisture in the compressed air system, from freezing in the static orifices and also in order to prevent foreign particles from clogging the static orifices.

SUMMARY OF THE INVENTION

Among the several objects of the invention may be noted the provision of a control valve for an antilock brake system which conserves the fluid pressure supply for such systems; the provision of an antilock brake system and control valve therefor which afford a "choice" with respect to fluid pressure reapplication rates during each cycle of the system thereby to minimize overshoot of the optimum reapplication pressure for effecting a smooth vehicle skid control stop; the provision of a self-cleaning, anticlogging orifice control which predeterminately controls the reapplication pressure fluid flow but provides substantially free exhaust flow thereof thereby to minimize overshooting in an antilock brake system and control valve therefor; the provision of such a control valve which reduces excessive free wheel roll and therefore the stopping distance effected by an antilock brake system; the provision of a control valve which reduces the overall structural stress on brakes of an antilock brake system; the provision of a control valve for an antilock brake system in which a residual pressure is maintained thereby to prevent full brake release during a braking cycle on a slippery roadbed; the provision of a control valve which prevents complete destroking of brake actuating components during the fluid pressure exhaustion cycle of an antilock brake system; the provision of a control valve for an antilock brake system in which a residual fluid pressure is maintained and the rate of exhausting fluid pressure flow is predeterminately varied; the provision of a control valve for an antilock brake system in which actuating control fluid pressure therefor is predeterminately bled into the control valve while at the same time such actuating control fluid pressure is being controllably exhausted; the provision of a control valve for an antilock brake system which can apply fluid pressure at different flow rates to such system depending on whether the recovery or acceleration rate of the braked vehicle wheel is fast or slow; the provision of a control valve for an antilock brake system having an initial slow fluid pressure application rate and a backup fast fluid pressure application rate; and the provision of an antilock brake system which does not overshoot the desirable fluid pressure at which the brakes of said system should be actuated when the vehicle is operating on a low-friction surface. Other objects and features will be in part apparent and in part pointed out hereinafter.

In general, a control valve of this invention for an antilock brake system comprises a housing having means movable therein in response to applied control fluid pressure between an inoperative position and an operative position for effecting the application through said housing of fluid pressure supplied thereto. Other means are movable in the housing to a position predeterminately restricting the applied flow of control fluid pressure to the first named means upon movement thereof to its operative position. Another control valve of this invention for an antilock brake system comprises a housing having a chamber for control fluid pressure therein, and relay means is movable in response to the control fluid pressure in the chamber for effecting the application through the housing of fluid pressure supplied thereto. A pair of flow passages for control fluid pressure are provided in the housing connecting wth the chamber, and a pair of solenoid means controls the flow of control fluid pressure through the flow passages, at least one of the solenoid means also being operative for venting control fluid pressure from the chamber. Still another control valve of this invention for an antilock brake system comprises a housing having a chamber therein for control fluid pressure, and relay means is movable in said chamber in response to control fluid pressure therein from an inoperative position to an operative position for effecting the application through the housing of fluid pressure supplied thereto. A pair of flow passages through which control fluid pressure is applied communicate with the chamber, and a pair of solenoids respectively vents control fluid pressure from the chambers. One of the solenoid means also controls the passage of control fluid pressure through one of the flow passages to the chamber, and means is movable in the other of said flow passages to a position predeterminately restricting the applied flow of control fluid pressure therethrough to the chamber upon the movement of the relay means to its operative positions. An antilock brake system of this invention comprises at least one fluid pressure responsive vehicle brake, and means for automatically and successively effecting the application of fluid pressure to the brake to effect energization thereof and the exhaustion of fluid pressure from the brake to effect partial deenergization thereof during a braking application. Means are provided for maintaining a residual pressure applied to the brake at least great enough to overcome the slack of the systems during the fluid pressure exhaustion part of the cycle. A method of this invention for automatically and successively effecting the cyclical application of fluid pressure to at least one fluid pressure responsive vehicle brake and exhaustion of fluid pressure from the brake to effect corresponding cyclical energization and deenergization thereof during a braking application comprises maintaining a residual pressure applied to the brake at least great enough to overcome the slack in the system during the cyclical exhaustions of fluid pressure from the brakes to effect at partial deenergization thereof, and predeterminately varying the rate of fluid pressure cyclically applied to the brakes to effect energization thereof. Another control valve of this invention for an antilock brake system is provided with a housing, an expansible fluid pressure chamber therein, and a pressure fluid flow passage for communication with the chamber. Means is movable between one position in the flow passage for restricting pressure fluid flow therethrough to the chamber and another position in the flow passage in response to a fluid pressure differential established between the flow passage and the chamber acting across the restricting means thereby to permit a substantially unrestricted exhausting flow of fluid pressure from the chamber through the flow passage.

BRIEF DESCRIPTION OF THE DRAWINGS

Corresponding reference characters indicate corresponding parts throughout the several views of the drawings.

DETAILED DESCRIPTION OF THE INVENTION

Figure 1:
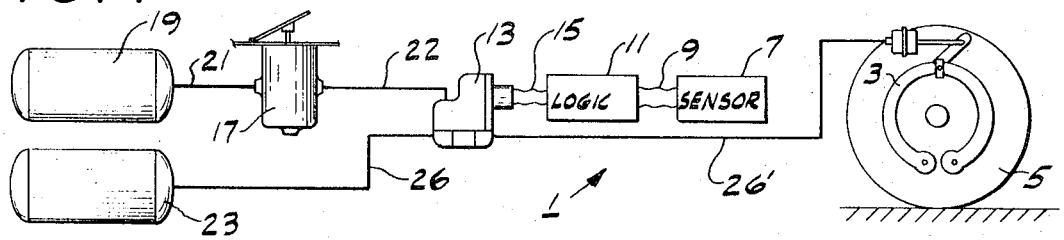
FIG. 1 is a diagrammatic view of an antilock brake system of this invention.

Referring now to FIG. 1, there is shown at 1 an antilock brake system having a vehicle brake 3 for retarding a vehicle wheel rollable on a roadbed or surface having various coefficients of friction depending on the texture of the road bed materials and the prevailing weather conditions. Speed of wheel 5 is measured by sensor component 7, and the sensor component produces an electrical signal correlative of instantaneous wheel speed. The electrical signal is transmitted through leads 9 to logic component 11 which interprets such signal and energizes control valve means 13 through leads 15 for either increasing or decreasing the magnitude of fluid pressure applied to brake 3 during a vehicle braking application. The braking application for vehicle retardation is initiated by the vehicle operator actuating a foot valve 17, or the like, to deliver service or control fluid pressure from a source thereof, such as reservoir 19, through conduits 21, 22 to the control port of control valve 13. Control valve 13 is actuated in response to control fluid pressure applied thereto to controllably apply fluid pressure from another source, such as reservoir 23, through conduits 26, 26' to energize brake 3. Brake 3 is also de-energized by the exhaustion of applied fluid pressure through conduit 26 and control valve 3.

Figure 2:
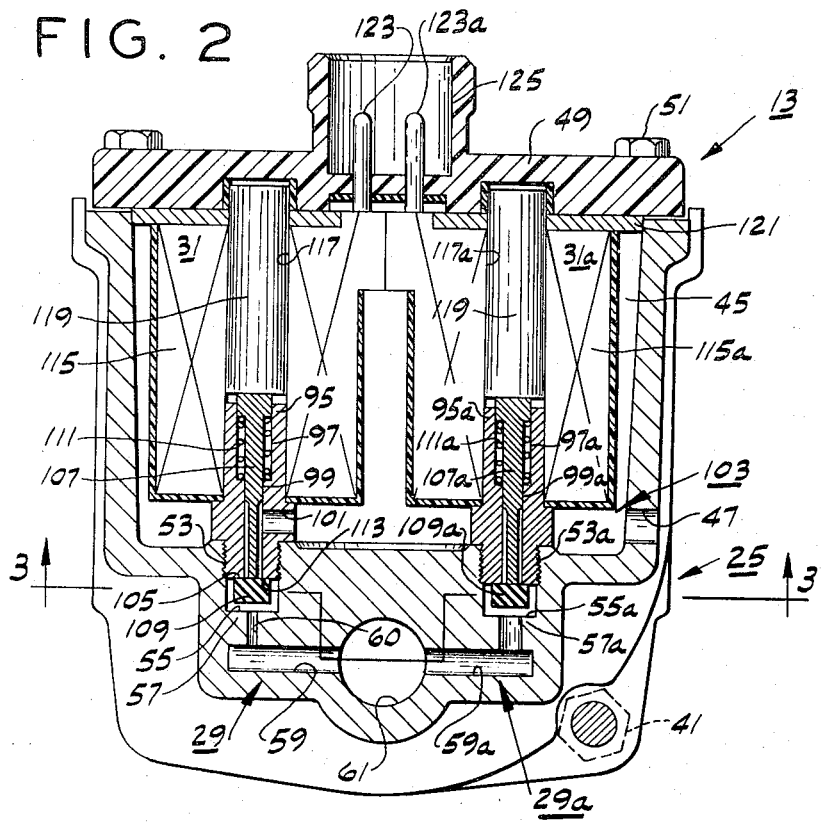
FIG. 2 is a sectional view of a control valve of this invention shown in FIG. 1.
Figure 3:
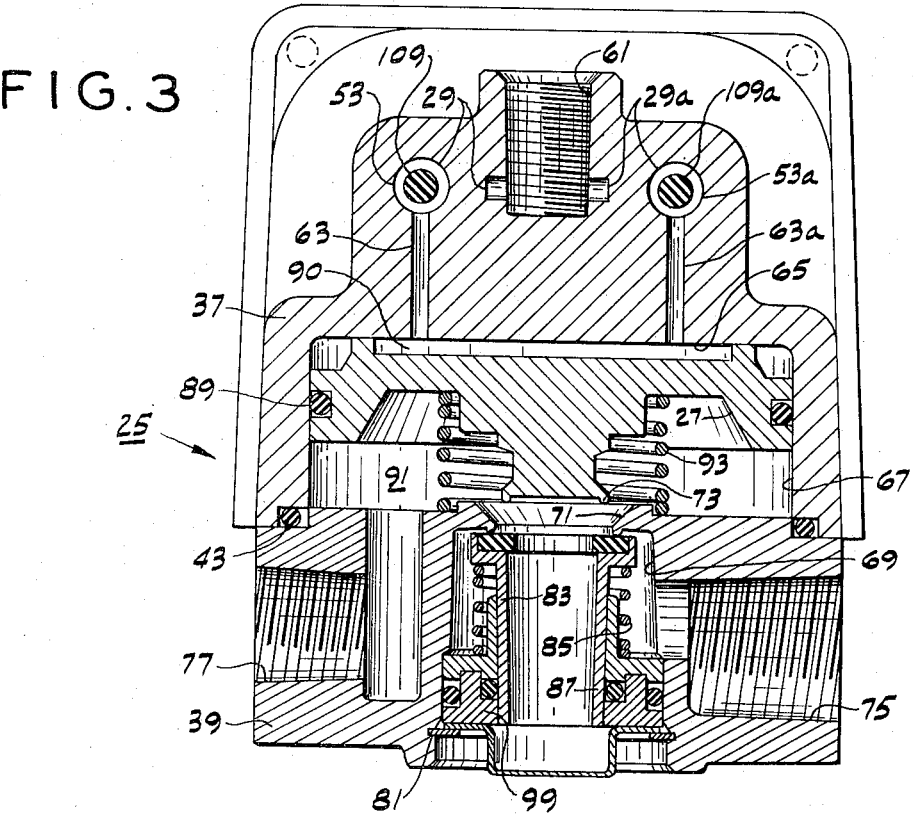
FIG. 3 is a sectional view taken on line 3—3 of FIG. 2.

There is shown in FIGS. 2 and 3 the control valve 13 having a housing 25 in which a relay means or piston 27 is movable in response to control fluid pressure applied thereto through a pair of flow passages 29, 29a to effect the application through the housing of fluid pressure supplied thereto, and solenoid means 31, 31a are disposed in the housing for controlling the flow of control fluid pressure applied through the flow passages.

Housing 25 is provided with upper and lower parts 37, 39 secured together by suitable means, such as a plurality of studs 41, and a seal or O-ring 43 is sealably disposed between the upper and lower housing parts.

Upper housing 37 is provided with a solenoid chamber 45 with which connects an exhaust port 47, and a closure member 49 formed of plastic or other suitable insulating material is attached to the upper housing by a suitable means, such as a plurality of studs 51, thereby to close the solenoid chamber. Threaded recesses 53, 53a are also provided in upper housing 37 intersecting with solenoid chamber 45, and valve seats 55, 55a are provided on recess end walls 57, 57a about passages 59, 59a which intersect with the recess end wall and connect with a control port 61 which receives conduit 22, as previously mentioned, for the selective application of control fluid pressure thereto from the antilock brake system. Passage 59 is restricted at 60. Vertical passages 63, 63a have their upper ends communicating with recess 53, 53a adjacent the end walls 57, 57a, and the lower ends of the substantially vertical passages respectively intersect with the end wall 65 of a vertical bore 67 provided in the upper housing.

Lower housing 39 is provided with an inlet or valve chamber 69 communicating with the upper housing bore 67 through a passage 71, and a valve seat 73 is provided about the passage 71. A fluid pressure reservoir or inlet port 75 which receives conduit 25, as previously mentioned, is provided in lower housing 39 communicating with valve chamber 69, and a delivery or outlet port 77, which receives conduit 26 as previously mentioned, is also provided in the lower housing communicating with upper housing bore 67. A valve guide and closure 79 is positioned in the inlet chamber 69 against displacement by a snap ring and groove assembly 81, and an inlet or poppet valve 83 is slidably received in valve guide 79 being urged towards sealing engagement with valve seat 73 by a valve spring 85 interposed between the poppet valve and valve guide. An exhaust passage 87 is axially provided through poppet valve 83 communicating with upper housing bore 67 and lower housing outlet port 77.

Relay piston 27, which controls the application of brake energizing fluid pressure from source 23 to brake 3, is slidably received in upper housing bore 67 and carries a peripheral seal 89 in sealing engagement with the upper housing bore. A control fluid pressure chamber 90 is provided in upper housing bore 67 between its end wall 65 and the upper side of relay piston 25, which is normally urged toward an inoperative position engaged with the end wall, and an outlet chamber 91 is provided in the upper housing bore beneath the relay piston and communicating with outlet port 77 and atmosphere through poppet valve exhaust passage 87. A valve seat 92 is provided on relay piston 25 for operating engagement with poppet valve 83, and a return spring 93 is interposed between the relay piston and the housing 39 urging the relay to its inoperative position.

Pole pieces 95, 95a of solenoids 31, 31a are threadedly received in recesses 53, 53a and extend generally axially therefrom into solenoid chamber 33. Stepped passages 97, 99 and 97a, 99a are provided axially through the pole pieces, and a cross-passage 101 communicates between smaller stepped passage 99 of pole piece 95 and solenoid chamber 33. The pole piece smaller stepped passage 99, and cross-passage 101 and solenoid chamber 33 constitute exhaust passage means 103 which connects with the ehxaust port, and an exhaust valve seat 105 is provided on the end of pole piece 95 within recess 53 about smaller stepped passage 99. A pair of stepped valve stems 107, 107a are slidably received in stepped passages 97, 99 and 97a, 99a of pole pieces 95, 95a, and valve means 109, 109a are provided on the ends of the valve stems within recesses 53, 53a for engagement with housing valve seats 55, 55a. Valve stems 107, 107a and valve means 109, 109a are normally biased toward the positions shown in FIG. 1 by valve springs 111, 111a disposed within larger stepped passages 97, 97a of pole pieces 95, 95a between the valve stems and pole pieces. Exhaust valve means 113 is provided on valve stem 107 opposite to valve means 109 and normally urged into engagement with exhaust valve seat 105 thereby to close exhaust passage means 103.

Solenoid means 31, 31a are also provided with generally cylindric electrical coils 115, 115a having bores 117, 117a which are received about the ends of pole pieces 95, 95a within solenoid chamber 45 thereby to mount the coils within the solenoid chamber. Solenoid armatures 119, 119a are movable in bores 117, 117a for magnetic holding engagement with pole pieces 95, 95a and driving engagement with valve stems 107, 107a for actuating valve means 109, 109a and exhaust valve means 113. A flux plate 121 is disposed in solenoid chamber 45 between closure member 49 and the electrical coils 115, 115a, and terminals 123, 123a of the electrical coils extend through the closure member into a socket 125 provided in the closure member for connection logic leads 15.

With the component parts of control valve 13 positioned as shown in the drawings and as described, if the vehicle operator desires to effect a service brake application or brake energization to decelerate the vehicle, a control fluid pressure is selectively applied to the control port 61 from reservoir 19 through conduits 21, 22 upon operator actuation of application valve 17. Control fluid pressure flows from control port 61 through flow passages 29, 29a into control chamber 90 creating a control force Fc urging relay piston 25 downwardly from its inoperative position to an operative position engaging relay piston valve seat 92 with poppet valve 83 and thereafter moving the poppet valve toward a position disengaged from the lower housing valve seat 73 to effect fluid pressure communication between the inlet and outlet ports 75, 77. Supply or inlet fluid pressure flows from its source 23 to inlet port 75, inlet chamber 69, and outlet chamber 91 to establish an output or applied fluid pressure at outlet port 77 which flows through conduit 26 to energize the vehicle brake 3 for decelerating the vehicle.

When the reaction force Fr created by established outlet fluid pressure in outlet chamber 91 acting on the effective area of relay piston 25 therein substantially equals the control force Fc, the relay piston is moved upwardly toward its lapped position and poppet valve 83 follows toward its lapped position, thereby to provide lapped engagement between relay piston valve seat 92 and the poppet valve and between housing valve seat 73 and the poppet valve.

If the desired braking effort or brake energization is attained without engendering wheel lock-up or vehicle-skid condition and the operator deactuates foot valve 17 to exhaust the control fluid pressure, the control fluid pressure flows from control chamber 90 through flow passages 29, 29a to control port 61 and to atmosphere through conduit 22 and the foot valve. The exhaustion of the control fluid pressure eliminates the control force Fc, and the reaction force Fr and compressive force of return spring 93 urge relay piston 25 upwardly toward its original inoperative position into engagement with housing wall 65, thereby to disengage relay piston valve seat 92 from poppet valve 83 to again open poppet valve exhaust passage 83 for exhausting fluid pressure from brake 3 through conduit 26', outlet port 77 and outlet chamber 91 to the atmosphere. Upon such exhaustion of the applied fluid pressure, the reaction force Fr is also eliminated.

If the output fluid pressure applied to energize vehicle brake 3 during the above-described brake application is of a magnitude great enough to effect wheel lock-up or vehicle-skid condition, the brake antilock system logic component 11 and sensor component 9 ascertain such wheel lock-up and signal control valve 13, indicating in effect that the magnitude of the output fluid pressure should be reduced. To effect such reduction, logic component 11 excites or energizes solenoid coils 115, 115a creating a magnetic force which moves armatures 117, 117a into magnetic holding engagement with pole pieces 95, 95a, and the movement of the armature means drives valve stems 107, 107a toward positions engaging valve means 109, 109a with valve seats 55, 55a about flow passages 29, 29a, thereby to interrupt pressure fluid communication therethrough between control port 61 and control chamber 90 to isolate control fluid pressure in the control chamber. When valve means 109, 109a are moved toward their position engaged with valve seats 55, 55a, exhaust valve means 113 is conjointly moved toward a position disengaged from exhaust valve seat 105, thereby to establish exhausting flow of control fluid pressure through exhaust passage means 103 to atmosphere. Since control fluid pressure is being controllably exhausted to effect a continuous reduction in the control force Fc, the reaction force Fr urges relay piston 27 upwardly from its lapped position to displace its valve seat 92 from poppet valve 83 thereby to open poppet valve exhaust passage 87 and exhaust the applied fluid pressure from the brakes 3 to atmosphere, as previously described. The controlled exhaustion of control fluid pressure from control chamber 90 effects a corresponding reduction in applied fluid pressure at outlet port 77 to partially de-energize brake 3. During the exhaustion part of the fluid pressure applying and exhausting cycles of antilock brake system 1, the applied fluid pressure energizing brake 3 is not completely exhausted, and control fluid pressure having a magnitude at least great enough to overcome the system slack, i.e., the spring and friction forces of the system components, is maintained in control chamber 90 acting on relay piston 25 thereby to maintain a corresponding or proportional magnitude of the applied fluid pressure to at least overcome the system slack. The degree to which the applied fluid pressure is exhausted during a system cycle depends upon the coefficient of the roadbed and the acceleration of the braked wheel during its free roll after brake deenergization. If the roadbed has a high coefficient, less applied fluid pressure is exhausted as compared with a low coefficient roadbed which is slick.

When brake 3 is deenergized by exhausting control fluid pressure thereby to relieve the incipient skid condition the vehicle wheels roll free, and the sensor and logic components 7, 11 of the antilock brake system 1 discern such and signal control valve 13 that the input fluid pressure should be increased. At this time, sensor and logic components 7, 11 are reading and interpreting wheel acceleration, and logic component 11 may elect to reapply at fast or slow fluid pressure flow rates depending upon whether the wheel acceleration is fast or slow. If wheel acceleration is fast, then logic component 11 will deenergize solenoid 31, 31a, and valve springs 111, 111a will return valve means 109, 109a to their original positions closing exhaust passage 103 and opening flow passages 29, 29a to effect a fast reapplication of control fluid pressure therethrough into chamber 90. The reapplication of control fluid pressure into chamber 90 increases the control force thereby to actuate control piston 27 and poppet valve 83 and increase the magnitude of the fluid pressure applied to brake 3 for effecting reenergization thereof. If, during the fast reapplication of the applied fluid pressure, sensor and logic components 7, 11 ascertain that the applied fluid pressure magnitude is rising too fast so as to again ascertain an incipient skid condition, the logic component effects energization of solenoid 31a thereby to reengage valve means 109a with valve seat 55a to again close flow passage 29a, as previously described, and control fluid pressure then alternatively flows through restriction 60 in flow passage 29 into chamber 90. In this manner, the slow or low flow rate is effected since control fluid pressure flow through flow passage 29 is restricted. If the slow rise rate of control fluid pressure flow effects a corresponding increase in applied fluid pressure at brake 3 which does not effect wheel lock-up or a skid condition, then the low flow rate will be continued so as not to overshoot the optimum magnitude of the increased applied fluid pressure at the brake which is necessary to afford a smooth vehicle deceleration. Of course, if the low rise rate of the control fluid pressure flow is ascertained by sensor and logic components as not effecting a rapid enough vehicle deceleration, then logic component 11 will cause control valve 13 to revert to its fast flow rate mode of operation, as previously described. If, during slow flow rate mode of control valve 13, sensor and logic components again ascertain an incipient vehicle skid condition, then logic component 11 acts to deenergize solenoid 31a thereby to return valve means 109a to its original position reopening flow passage 29a. Since valve means 109, 109a are now both in their original positions opening flow passages 29, 29a while valve means 109 closes exhaust passage 103, control valve means 13 is now conditioned for recycling of antilock brake system 1.

From the foregoing, it is apparent that control valve 13 conserves the fluid pressure supply to antilock brake system 1 by supplying brake actuating fluid pressure thereto at a full flow rate and a lower flow rate depending upon the recovery acceleration of the brake vehicle wheels. The variation in the flow rates of brake actuating fluid pressure also reduces excessive free-wheel roll and therefore the stopping distance of the vehicle since the entire volume of the applied brake actuating fluid pressure is not exhausted, but instead control valve 13 merely exhausts a portion of the applied brake actuating fluid pressure to deactuate vehicle brake 3. As previously mentioned, control valve 13 applies fluid pressure at different rise rates to antilock brake system 1 depending upon whether the acceleration rate of the brake vehicle wheel 5 is fast or slow during the system cycle, and the control valve thereby is provided with an initial slow fluid pressure application rate and has a back-up fast fluid pressure application rate to supplement the pressure rise of brake actuating fluid pressure. The fast and slow flow rate modes of operation of control valve 13 in system 1 prevent overshooting of the reapplication fluid pressure necessary to effect a smooth vehicle skid control stop.

Figure 4:
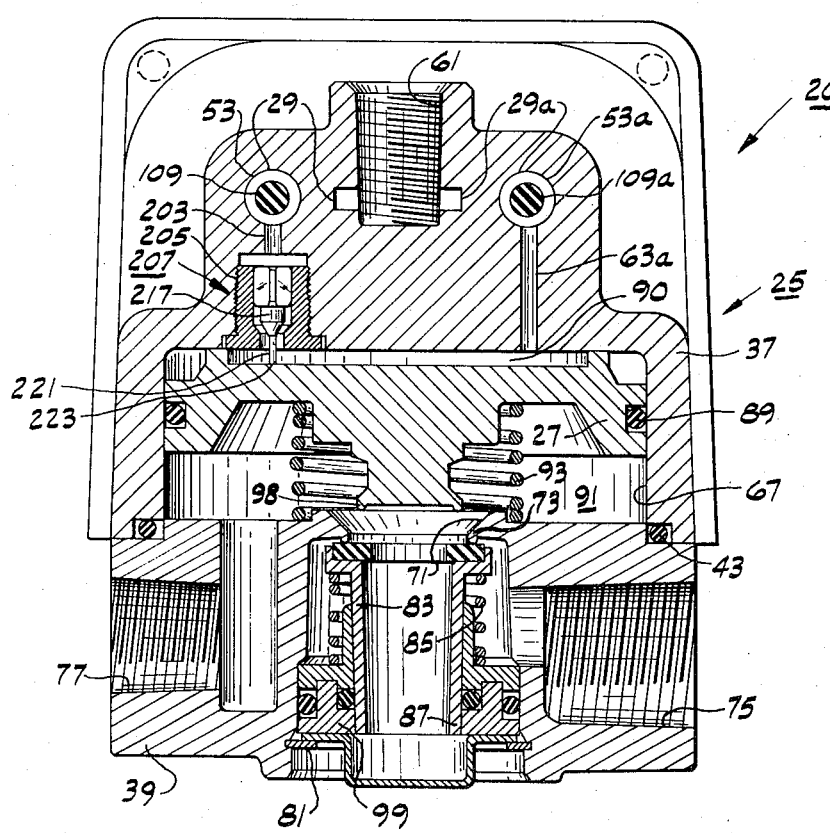
FIG. 4 is a sectional view of another control valve of this invention including an orifice device provided in a flow passage between a control port and control chamber of the control valve.
Figure 5A:
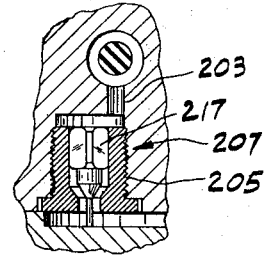
FIG. 5A is a fragmentary view taken from FIG. 4 illustrating an alternative construction of the orifice device in the control valve of this invention.
Figure 5:
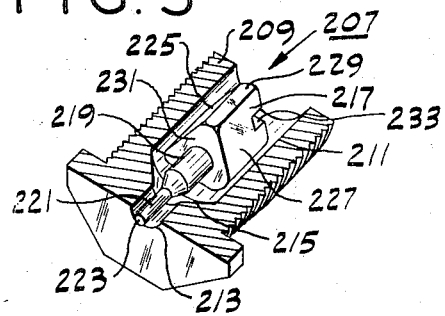
FIG. 5 is a fragmentary perspective view of the orifice device of FIG. 4.

Referring now to FIGS. 4 and 5, an alternative construction for another control valve 201 is shown having substantially the same component parts and operating substantially in the same manner as the previously described control valve 13 with the following exceptions:

In upper housing 37 of control valve 201, restriction 60 is omitted from flow passage 29. Vertical stepped passages 203, 205 which constitute a portion of flow passage 29 are provided between recess 53 and control chamber 90, and an orifice or flow restricting device 207 is threadedly received in the larger vertical stepped passage 203. Orifice device 207 is provided with a threaded tube nut-like fitting or body 209 which is threadedly received in threaded passage 205, and stepped bores 211, 213 having an annular shoulder 215 therebetween are provided in the body extending substantially axially therethrough in alignment with smaller stepped passage 203 of housing 37. Stepped bores 211, 213 which extend through body 209 also constitute a portion of flow passage 29, and the smaller stepped passage 213 constitutes orifice means or restriction means in the flow passage. While orifice device 207 is provided with body 209, it is apparent that body 209 could be an integral part of upper housing 37. An orifice plunger or pin 217 is movable in stepped bores 211, 213 of body 209, and plunger 217 is provided with stepped generally cylindric extensions 219, 221 having diameters which are respectively sized to be movable within orifice 213. Lower end 223 of smaller extension 221 constitutes an abutment or a means for engaging the upper side of relay piston 25, and a guide and abutment member 225 is integrally provided on upper end of larger cylindric extension 219. Guide 225 is provided with a plurality of flats 227 to permit passage of control fluid pressure past plunger 217 through the larger stepped bore 211, and a plurality of guide surfaces 229 are provided on plunger guide 225 in sliding engagement with larger stepped bore 211 of body 209 to substantially center cylindric extensions 219, 221 with orifice 213 for movement thereinto. Plunger guide 217 is also provided with an abutment 231 which is engageable with body shoulder 215 thereby to limit the movement of larger cylindric extension 219 through orifice 213, and the abutting engagement between abutment 231 and body shoulder 215 maintains orifice plunger 217 against displacement from body 209 upon the movement of relay piston 25 toward its operative position, as discussed hereinafter. A cross-slot 233 is provided in the upper end of orifice plunger 217 to obviate the possibility of closing off passage 203.

When orifice plunger 217 is positioned in body 209 with lower end 223 engaged with upper side of relay piston 25 in its inoperative position, smaller cylindric extension 221 extends through orifice 213 into control chamber 90, and in this position the orifice plunger provides for the substantially free or unrestricted flow of control fluid pressure through flow passage 29 into the chamber 90. Upon actuation of relay piston 25 in response to control fluid pressure in control chamber 90, as previously described, orifice plunger 217 and relay piston 25 are initially conjointly movable from their respective and inoperative positions toward their respective restricting and operative positions. The initial conjoint movement between relay piston 25 and orifice plunger 217 is defined by the distance between body shoulder 215 and pin guide abutment 231, and when the pin guide abutment is moved into abutting engagement with the body shoulder, the larger cylindric extension 219 extends at least partially into orifice 213 thereby to define the restricting position of orifice plunger 217. When orifice plunger 217 has been so moved to its restricitng position, relay piston 25 is thereafter further movable toward its operative position thereby to disengage the upper face thereof from lower free end 223 of the orifice plunger. Since the restriction or orificed flow area of orifice device 207 is the difference between the effective areas of orifice opening 213 and plunger extension 219, it is apparent that orifice opening 213 and extension 219 may be of a selected diameter perhaps many times larger than the orifice openings of the prior art. By utilizing larger orifice opening 213, foreign particles are dislodged therefrom by the initial flow or air therethrough and also may be dislodged by the reciprocal movement of orifice plunger 217. Therefore, orifice device 207 is substantially self-cleaning.

In the operation of the control valve 201, control fluid pressure flows through flow passages 29, 29a into control chamber 90, thereby to actuate relay piston 25 toward its operative position actuating poppet valve 83 to establish applied fluid pressure and energize vehicle brake 3, as previously described. Again, logic and sensor components 11, 7 anticipate an incipient wheel skid condition, and the logic portion signals control valve 201 to reduce the control fluid pressure. To reduce control fluid pressure, logic component 11 energizes the solenoids 31, 31a thereby to move valve means 109, 109a thereof into seating engagement with housing valve seats 55, 55a closing flow passages 29, 29a. At the same time, exhaust valve means 113 is disengaged from its valve seat 105 opening the exhaust passage means 103 thereby to vent control fluid pressure from chamber 90 to atmosphere. Upon the initiation of the exhausting flow of control pressure, a fluid pressure differential is established across orifice plunger 217 between exhaust passage 103 and chamber 91 which is effective to move orifice plunger 217 upwardly to its free flow position so as not to inhibit exhausting flow of control fluid pressure from the chamber. The reduction of control fluid pressure in control chamber 90 effects a corresponding reduction of the applied fluid pressure by actuation of relay piston 25 and poppet valve 83 to effect partial deenergization of brake 3, and at this time logic and sensor components 11,7 will effect the reapplication of control valve 201 wherein solenoid 31a remains energized while solenoid 31 is deenergized. Deenergization of solenoid 31 permits valve spring 111 to move valve stem 107 and armature 119 to their original positions, and reengages exhaust valve means 113 with its seat 105 while disengaging valve means 109 from its housing valve seat 55 thereby to interrupt the exhausting flow of control fluid pressure through exhaust passage means 103 and effect a bleeding or orificed reapplication of control fluid pressure through flow passage 29 and orifice device 207 into control chamber 90. Therefore, the reapplication rate or rise of control fluid pressure to control chamber 90 may initially be rather low, i.e., orificed, and if the low flow rate does not quickly enough reenergize the brakes to limit free roll, then the reapplication rate is increased. The orificed reapplication of control fluid pressure to chamber 90 slowly raises the magnitude of the control fluid pressure therein, thereby to reactuate relay piston 25 and poppet valve 83 establishing a corresponding rise in the applied fluid pressure for reenergizing brake 3. If at this time a faster pressure rise rate is necessary to reenergize vehicle brake 3, as previously discussed, solenoid 31a will also be deenergized by logic component 11, thereby to open the unrestricted flow passage 29a providing unrestricted flow of control fluid pressure to control chamber 90 for the subsequent actuation of the relay piston 25 and the poppet valve 83 to effect a corresponding rise rate in the applied fluid pressure to further energize brake 3.

When the desired vehicle deceleration or stop has been obtained, the operator vents the control fluid pressure from control chamber 90 through unrestricted flow passage 29a, control port 61 and conduit 22 to atmosphere through foot valve 17, and relay piston 25 is returned from its operative to its inoperative position in engagement with housing shoulder 65 thereby to open exhaust passage 87 of poppet valve 83 and vent the applied fluid pressure from brake 3 to atmosphere, deenergizing the brake as previously described. The return movement of relay piston 25 engages its upper face with lower end 223 of orifice plunger 217 thereby conjointly moving the orifice plunger from its flow restricting position to its nonrestricting position.

In FIG. 5A there is shown an alternative construction wherein passage 203 is offset with respect to passage 205 and orifice device 207 thereby to obviate the possibility of undesired closure of passage 203 by the upper end of the orifice plunger 217 in the event that cross-slot 233 is not provided therein.

Figure 6:
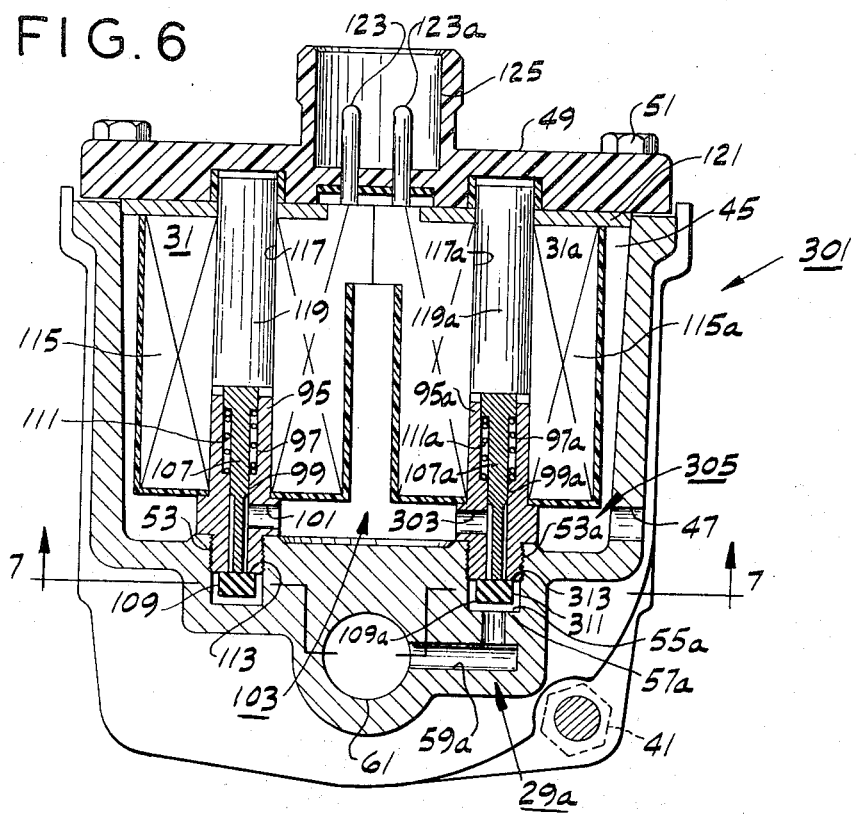
FIG. 6 is a sectional view of another control valve of this invention.
Figure 7:
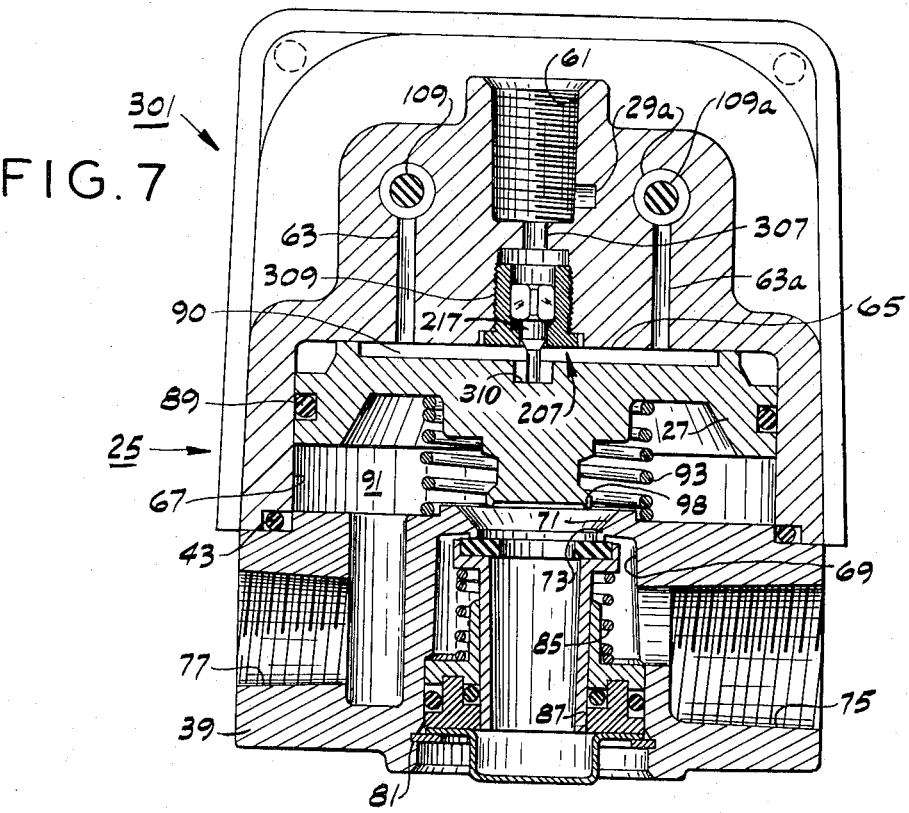
FIG. 7 is a sectional view taken on line 7—7 of FIG. 6.

Referring now to FIGS. 6 and 7, another control valve 301 is shown having substantially the same component parts and functioning in system 1 substantially in the same manner as the previously described control valves 13 and 201, with the following exceptions:

Control valve 301 is the same as control valves 13 and 201 except that previously described passage 59 is omitted wherein recess 53 is only connected by vertical passage 63 with control chamber 90, and cross passage 303 is provided in pole piece 95a connecting between pole piece smaller stepped passage 99a and the solenoid chamber 45. Pole piece smaller stepped passage 99a, cross passage 303 and solenoid chamber 45 constitute exhaust passage means 305 which connects with exhaust port 47, and exhaust passage means 305 is companion to exhaust passage means 103, both of which exhaust fluid pressure at substantially the same rate. Stepped passages 307, 309 communicate between control port 61 and control chamber 90, and orifice device 207, as also shown in FIG. 5, is threadedly received in the larger stepped passage 309. Recess 310 is provided in relay piston 27 so that orifice plunger 217 is not concertedly operable with or driven by the relay piston, as shown in FIG. 7. Exhaust valve means 311 on stem 107a opposite valve means 109 seats on exhaust valve seat 313 closing exhaust passage 305.

Control valve 301 is connected in system 1 and operates therein the same as the previously described control valves 13 and 201 except as follows: The control fluid pressure is applied to control valve 301 through flow passage 29a which connects with the control port 61 and through the bleed passage or orifice device 207, and orifice plunger 217 is normally positioned in its flow restricting position so as to restrict the rate of control fluid pressure flow through orifice device 207 to chamber 91 at all times. Exhaustion of the control fluid pressure from control chamber 90 to alleviate an incipient skid condition, as previously discussed, is initiated by logic component 11 energizing solenoid 31a. Coil 115a of solenoid 31a is excited thereby to move armature 119a into magnetic holding engagement with pole piece 95a, and armature movement conjointly drives valve stem 107a to a position disengaging its exhaust valve means 113 from its seat 105 thereby opening exhaust passage means 305 to vent control fluid pressure from the control chamber 90 to atmosphere.

While the solenoid 31a is energized, closing flow passage 29a and opening exhaust passage 305, control fluid pressure will continue to bleed through the orifice device 207 into chamber 90 at the same time control fluid pressure is being exhausted through exhaust passage means 305 from control chamber 90. The size of orifice opening 213 of orifice device 207 and the size of exhaust passage means 305 will effect a residual pressure acting on the relay piston 25 thereby to prevent the exhaustion of all of the control fluid pressure from control chamber 90 and maintain control fluid pressure having a magnitude slightly greater than required to overcome the system slack, as previously mentioned. If the rate of exhaustion of control fluid pressure from control chamber 90 through exhaust passage means 305 is not great enough to alleviate the incipient skid condition, then logic component 11 energizes solenoid 31. Excitation of coil 115 of solenoid 31 moves armature 119 into magnetic holding engagement with pole piece 95 thereby to conjointly drive valve stem 107 to a position displacing exhaust valve means 113 from its cooperating exhaust valve seat 105 to also open exhaust passage means 103. When exhaust passage means 103 and 305 are both open, control fluid pressure is exhausted from control chamber 90 at a higher or faster rate than the exhausting flow of control fluid pressure through only the exhaust passage means 305. The faster rate of exhaustion of control fluid pressure through exhaust passage means 103 and 305 will alleviate the incipient skid condition and maintain control fluid pressure having a magnitude at least great enough to overcome the system slack as previously mentioned. Of course, when control fluid pressure is exhausted from control port 61 through conduit 22 and foot valve 17 by the operator, such as for instance at the end of the braking application, a fluid pressure differential is established across orifice plunger 217 which is effective to move it upwardly from a flow restricting position to its substantially free flow position so as not to impede the exhaustion of control fluid pressure through the control port 61.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:

1. A control valve for an antilock brake system comprising a housing, means movable in said housing in response to control fluid pressure applied thereto between an inoperative position and an operative position for effecting the application through said housing of fluid pressure supplied thereto; and other means movable in said housing to a position predeterminately restricting the applied flow of control fluid pressure to said first named means upon movement thereof to its operative position, said other means comprises means for engagement with said first named means in its inoperative position thereby to urge said other means to a substantially non-restricting position in said housing.

2. A control valve according to claim 1, further comprising means in said housing constituting an orifice through which the applied flow of control fluid pressure passes to said first named means, said other means being movable within said orifice between its flow restricting and non-restricting positions.

3. A control valve according to claim 2, wherein said other means further comprises abutment means for engagement with said housing adjacent said orifice thereby to maintain said other means within the orifice when said other means is in its flow restricting position.

4. A control valve according to claim 3, wherein said first named means and other means are initially conjointly movable toward their respective operative and flow restricting positions, and said first named means being further movable to its operative position independently of said other means upon the engagement of said engagement means with said housing.

5. A control valve according to claim 4, wherein passage through said orifice of the applied flow of control fluid pressure to said first named means during the initial conjoint movement thereof with said other means substantially clears said orifice of clogging foreign particles.

6. A control valve according to claim 2, wherein said other means further comprises an orifice plunger having a pair of stepped extensions sized for movement within said orifice, the larger stepped extension extending at least partially into said orifice thereby to reduce th effective flow area thereof when the orifice plunger is in the flow restricting position.

7. A control valve according to claim 6, wherein the smaller stepped extension extends through said orifice when said orifice plunger is in its nonrestricting position.

8. A control valve according to claim 7, wherein at least the larger stepped extension is generally cylindric.

9. A control valve according to claim 7, wherein said engagement means constitutes the free end of said smaller stepped extension.

10. A control valve according to claim 9, wherein said other means further comprises abutment means on the other end of said orifice plunger adjacent said larger stepped extension and engageable with said housing adjacent said orifice thereby to maintain said orifice plunger against displacement through said orifice when said other means is in its flow restricting position.

11. A control valve according to claim 10, further comprising passage means in said housing substantially axially aligned with and larger than said orifice, and a shoulder between said passage means and orifice, said abutment means being engaged with said shoulder when said other means is in its flow restricting position.

12. A control valve according to claim 11, wherein said other means further comprises guide means on the other end of said orifice plunger for sliding engagement with said passage.

13. A control valve for an antilock brake system comprising a housing, a chamber in said housing for control fluid pressure, relay means movable in said chamber in response to control fluid pressure therein for effecting the application through said housing of fluid pressure supplied thereto; a pair of flow passages in said housing connecting with said chamber through which control fluid pressure is applied, a pair of solenoid means for controlling the flow of control fluid pressure through said flow passages, and at least one of said solenoid means also being operable for venting control fluid pressure from said chamber.

14. A control valve according to claim 13, wherein said one solenoid means is energized to close one of said flow passages and vent control fluid pressure from said chamber to atmosphere.

15. A control valve according to claim 14, wherein the other of said solenoid means is energized to close the other of said flow passages.

16. A control valve according to claim 15, wherein one of said one and other solenoid means is energized prior to the other thereof.

17. A control valve according to claim 15, wherein said solenoid means are energized substantially simultaneously thereby to isolate the control fluid pressure in said chamber and vent the isolated control fluid pressure.

18. A control valve according to claim 13, wherein said relay means is movable in response to control fluid pressure in said chamber between an inoperative position and an operative position for effecting the application through said housing of the fluid pressure supplied thereto, and means movable in said one flow passage to a position predeterminately restricting the applied flow of control fluid pressure therethrough to said chamber upon the movement of said relay means to its operative position.

19. A control valve according to claim 18, said movable means comprising means for engagement with said relay means in its inoperative position thereby to urge said movable means to a substantially non-restricting position in said one flow passage.

20. A control valve according to claim 19, comprising means in said one flow passage constituting an orifice through which the applied flow of control fluid pressure passes to said chamber, said movable means being movable within said orifice between its flow restricting and non-restricting positions.

21. A control valve according to claim 20, said movable means further comprising abutment means for engagement with said housing adjacent said orifice thereby to maintain said movable means within the orifice when said movable means is in its flow restricting position.

22. A control valve according to claim 21, wherein said relay means and movable means are initially conjointly movable toward their respective operative and flow restricting positions, and said relay means being further movable to its operative position independently of said movable means upon the engagement of said engagement means with said housing.

23. A control valve according to claim 22, wherein the passage through said orifice of the applied flow of control fluid pressure to said chamber during the initial conjoint movement of said relay means with said movable means substantially clears said orifice of clogging foreign particles.

24. A control valve according to claim 20, said movable means further comprising an orifice plunger having a pair of stepped extensions sized for movement within said orifice, the large stepped extension extending at least partially into said orifice thereby to reduce the effective flow area thereof when said movable means is in its flow restricting position.

25. A control valve according to claim 24, wherein the smaller stepped extension extends through said orifice when said movable means is in its nonrestricting position.

26. A control valve according to claim 25, wherein at least the larger stepped extension is generally cylindric.

27. A control valve according to claim 25, wherein said engagement means constitutes the free end of said smaller stepped extension.

28. A control valve according to claim 27, said movable means further comprising abutment means on the other end of said orifice plunger adjacent said larger stepped extension and engageable with said housing adjacent said orifice thereby to maintain said orifice plunger against displacement through said orifice when said movable means is in its flow restricting position.

29. A control valve according to claim 28, wherein at least a portion of said one flow passage is substantially axially aligned with and larger than said orifice, and a shoulder between said one flow passage and orifice, said abutment means being engaged with said shoulder when said movable means is in its flow restricting position.

30. A control valve according to claim 29, said movable means further comprising guide means on the other end of said orifice plunger for sliding engagement with said one flow passage.

31. A control valve according to claim 13, wherein said solenoid means comprise a pair of valve means for controlling said flow passages, said valve means being movable to position closing said flow passages upon energization of said solenoid means, respectively.

32. A control valve according to claim 31, wherein said one solenoid means constitutes at least a portion of exhaust passage means for the venting flow therethrough of control fluid pressure and communicating with said chamber.

33. A control valve according to claim 32, wherein one solenoid means further comprises exhaust valve means for controlling said exhaust passage means and conjointly movable with one of said first named valve means, said exhaust valve means being movable to a position opening said exhaust passage means and said one first named valve means being conjointly movable therewith to close one of said flow passages upon the energization of said one solenoid means.

34. A control valve according to claim 33, further comprising an exhaust valve seat in said housing about said exhaust passage means for engagement with said exhaust valve means, said exhaust valve means being movable to a position disengaged from said exhaust valve seat thereby to open said exhaust passage means and vent control fluid pressure from said chamber upon the energization of said one solenoid means.

35. A control valve according to claim 34, further comprising a pair of other valve seats in said housing about said flow passages for engagement with said first named valve means, said first named valve means being respectively actuated into engagement with said other valve seats upon energization of said solenoid means.

36. A control valve according to claim 35, wherein said solenoid means further comprise a pair of pole pieces supported in said housing, means in one of said pole pieces constituting at least a portion of said exhaust passage means, and said exhaust valve seat being on said one pole piece about said exhaust passage means.

37. A control valve according to claim 36, wherein said solenoid means further comprise a pair of valve stems movable in said pole pieces, and said exhaust valve means and one of said first named valve means being carried on one of said valve stems and the other of said first named valve means being carried on the other of said valve stems.

38. A control valve according to claim 37, wherein said other valve means is carried on said one valve stem adjacent and opposite to said exhaust valve means.

39. A control valve according to claim 38, wherein said solenoid means further comprise a pair of coil means extending about at least a portion of said pole pieces, and armature means movable in said coil means for driving engagement with said valve stems, said armature means being movable into magnetic holding engagement with said pole pieces upon energization of said solenoid means thereby to excite said coil means, and the movement of said armature means also driving said valve stems to conjointly actuate said exhaust valve means and said one first named valve means carried on said one valve stem and also to actuate said other first named valve means carried on said other valve stem.

40. A control valve according to claim 39, wherein one of said one solenoid means and the other of said solenoid means is energized prior to the energization of the other thereof.

41. A control valve according to claim 39, wherein said solenoid means are energized substantially simultaneously thereby to isolate the control fluid pressure in said chamber and vent it to atmosphere.

42. A control valve according to claim 39, wherein the other of said solenoid means is also operable for venting control fluid pressure from said chamber, said other solenoid means being energized to close the other of said flow passage and vent control fluid pressure from said chamber to atmosphere.

43. A control valve according to claim 42, wherein one of said one and other solenoid means is energized prior to the other thereof.

44. A control valve according to claim 42, wherein said solenoid means are energized substantially simultaneously.

45. A control valve according to claim 13, further comprising chamber means in said housing in which said solenoid means are disposed, said chamber means extending generally in a plane which intersects that in which the axis of said relay means is disposed.

46. A control valve for an antilock brake system comprising a housing, a chamber in said housing for control fluid pressure, relay means movable in said housing in response to control fluid pressure therein from an inoperative position to an operative position for effecting the application through said housing of fluid pressure supplied thereto, a pair of flow passages in said housing communicating with said chamber through which control fluid pressure is applied a pair of solenoid means in said housing for respectively venting control fluid pressure from said chamber, one of said solenoid means also controlling passage of control fluid pressure through one of said flow passages to said chamber, and means movable in the other of said flow passages to a position predeterminately restricting the applied flow of control fluid pressure therethrough to said chamber upon the movement of said relay means to its operative position.

* * * * *